(No Model.)
J. P. NUGENT.
FODDER BINDER.
No. 594,487.  Patented Nov. 30, 1897.
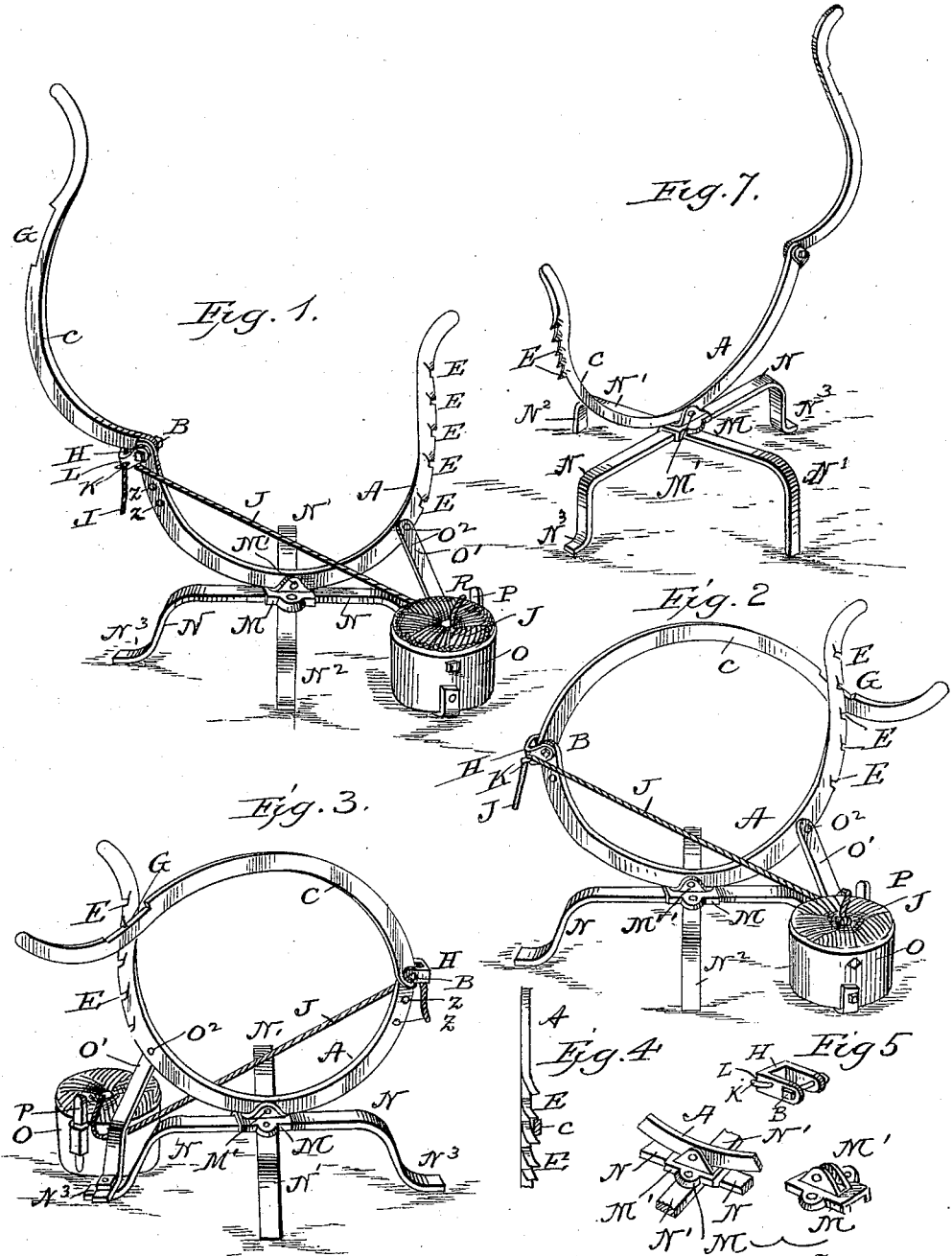

UNITED STATES PATENT OFFICE.

JOHN P. NUGENT, OF DUBUQUE, IOWA.

FODDER-BINDER.

SPECIFICATION forming part of Letters Patent No. 594,487, dated November 30, 1897.

Application filed February 25, 1896. Serial No. 580,739. (No model.)

*To all whom it may concern:*

Be it known that I, JOHN P. NUGENT, a citizen of the United States, residing at Dubuque, in the county of Dubuque and State of Iowa, have invented a new and useful Improvement in Corn-Fodder Binders, of which the following is a specification.

My invention relates to binding corn-fodder in bundles; and among the objects designed to be accomplished by my improvement are to provide the means embodied in a portable press-frame of capable size and form for receiving and holding each bundle and of permitting its being squeezed or compressed by a lever attachment thereto into a small compress and held therein by a catch until a band is tied about it. I attain these objects by the mechanism illustrated in the accompanying drawings, in which—

Figure 1 is a perspective view showing binder open for receiving the stalks in forming the bundles. Fig. 2 is a perspective view showing it closed, as would appear when bundle is formed and ready for the band. Fig. 3 is a perspective view showing the opposite side of the binder to that shown in the previous figures. Figs. 4, 5, and 6 are detail views of parts entering into the construction of the binder. Fig. 7 is a perspective view of a portion of the device, illustrating more clearly the construction of the support.

The frame of my binder is constructed substantially of light bar-steel and can be conveniently carried by hand from shock to shock in the corn-field for the making up of the bundles, the curved part A receiving the stalks as they are cut.

Jointed connection is made by bolt at B with the lever-arm C. This arm, when pressed down, Fig. 2, upon the gathered stalks, squeezes them closely within the receptacle A and can be caught or locked by catching its upper edge, which is beveled at G for that purpose, under either of the projecting hooks, tongues, or notches E to secure it a better hold, thus enabling the operator to readily bind the bundle. The hooks or notches E are cut out by dies from the bar A and are further shown in Fig. 4.

Attached to the jointed bolt connection B is a clevis H, Fig. 5, having for its immediate object the reception and retaining in a reaching position of the lever-arm C when the same is open, as at Fig. 1. Cast in connection with this clevis and upon the side adjacent to the twine or cord J extends a projection K, (shown in detail at Fig. 5,) having an opening or slit L between it and the body of the clevis for the holding of the said twine within convenient reach of the operator.

The above-described framework of my binder rests within a holder or clasp M, which is secured centrally at the place M' to light bar-steel supports N N', running centrally at right angles to each other and held in place by the holder or clasp M, substantially as shown in Figs. 1, 2, 3, and 6. One of the supports, N, has its extremities $N^3$ turned horizontally outward to prevent its sinking in moist or wet ground. The other support, N', is constructed without this feature, but with one of its curved ends, as $N^2$, shorter than the other to allow the butt-ends of the stalks to rest conveniently upon the ground, as shown in Fig. 7.

A twine holder or box O, located upon the same side as the operator, is rigidly secured to the bar A by a connecting-bar O' at $O^2$ and to the extremity $N^3$ of one of its supports N, substantially as shown at Figs. 1, 2, and 3. From the box O a section of the twine or cord J is inserted in an intervening space R between the said box and the bar O' and is passed across and fastened into the slit L, and on completion of the bundle is then brought around it and tied. It is then cut, after which the lever-arm C is loosened and thrown back and the bundle removed.

To facilitate the cutting of the twine, I attach a sheath P to the outside of the twine-box O for holding a case-knife conveniently within reach of the operator, and for the purpose of binding still smaller bundles, if required, I prepare the bar A with openings Z for the reception of the bolt B of the lever-arm C, which lever should be removed thereto for that purpose.

What I claim as my invention, and desire to secure by Letters Patent, is—

1. In a corn-fodder binder, the combination with a support adapted to rest upon the ground of a curved bar secured to said support, a second curved bar pivotally connected to the first bar, means for detachably securing the bars together at various points of adjustment of the second bar, a bail or clevis adapted to limit the throw of the second bar away from the first bar and support said second bar, a projection on said clevis and forming a throat adapted to secure the twine, and a twine-holder secured to the support.

2. In a corn-fodder binder, the combination with a support adapted to rest upon the ground, said support consisting of arms crossing each other at an angle, and secured together and being bent downward to form legs, one leg being shorter than the opposite leg and the other legs being of an intermediate length for the purpose described, of a curved bar secured to the support, a second curved bar pivotally secured to the first bar, and means for detachably securing the bars together at various points of adjustment of the second bar as set forth.

JOHN P. NUGENT.

Witnesses:
ALEX. SIMPLOT,
MICHAEL P. KENNA.